United States Patent
Oztop (10) Patent No.: US 8,019,762 B2
(45) Date of Patent: Sep. 13, 2011

(54) BINARY DATA CLASSIFICATION METHOD, BINARY DATA CLASSIFICATION DEVICE, COMPUTER PROGRAM, AND STORAGE MEDIUM

(75) Inventor: Erhan Oztop, Souraku-gun (JP)

(73) Assignee: Japan Science & Technology Agency, Kawaguchi (JP)

( * ) Notice: Subject to any disclaimer, the term of this patent is extended or adjusted under 35 U.S.C. 154(b) by 571 days.

(21) Appl. No.: 12/223,530

(22) PCT Filed: Feb. 2, 2007

(86) PCT No.: PCT/JP2007/051807
§ 371 (c)(1),
(2), (4) Date: Aug. 1, 2008

(87) PCT Pub. No.: WO2007/088973
PCT Pub. Date: Aug. 9, 2007

(65) Prior Publication Data
US 2009/0049085 A1 Feb. 19, 2009

(30) Foreign Application Priority Data
Feb. 2, 2006 (JP) .................................. 2006-026330

(51) Int. Cl.
*G06F 7/00* (2006.01)
(52) U.S. Cl. ........................................ 707/737; 707/776
(58) Field of Classification Search .................. 707/737, 707/776
See application file for complete search history.

(56) References Cited

FOREIGN PATENT DOCUMENTS
JP    2000-293502    10/2000

OTHER PUBLICATIONS

Toshihide Ibaraki et al., "Logical Analysis of Data and Boolean Functions," IEICE Technical Report, The Institute of Electronics Information and Communication Engineers, vol. 97, No. 416, pp. 39-44.

Ryan O'Donnell et al., "Extremal Properties of Polynomial Threshold Functions," Proceedings of the 18th IEEE Annual Conference on Computational Complexity, pp. 1-10.

Erhan Oztop, An Upper Bound on the Minimum Number of Monomials Required to Separate Dichotomies of $\{-1,1\}n$, Neural Computation 18, pp. 3119-3138.

Erhan Oztop, An Algorithm that Solves Any Binary Classification Problem in $\{-1,1\}n$ with an upper bound guarantee on the Minimum Number of Monomials, pp. 1-7.

International Search Report for PCT/JP2007/051807, mailed Feb. 27, 2007.

*Primary Examiner* — Apu Mofiz
*Assistant Examiner* — Cindy Nguyen
(74) *Attorney, Agent, or Firm* — Edwards Angell Palmer & Dodge LLP; David G. Conlin; George N. Chaclas (57) ABSTRACT

An information processing apparatus 100 for realizing a binary data classification method of the present invention includes a CPU for computing a column vector a that has at least a quarter of its components equal to zero, which satisfies $\text{diag}(y)D''a>0$, where a represents a column vector having a coefficient of each term of the set polynomial function as an element, $D''$ represents a matrix determined on the basis of a combination of the values taken by the respective terms, and y represents a row vector having as an element the value of a class to which binary data in which a value of each element is 1 or −1 should be classified when the binary data is given, and thus classifies the data of an object of classification, which is inputted through a keyboard, in accordance with a set polynomial function.

3 Claims, 11 Drawing Sheets

| $X_0$ | $X_1$ | $X_2$ | CLASS |
|---|---|---|---|
| 1 | 1 | 1 | −1 |
| −1 | 1 | 1 | −1 |
| 1 | −1 | 1 | −1 |
| −1 | −1 | 1 | −1 |
| 1 | 1 | −1 | 1 |
| −1 | 1 | −1 | 1 |
| 1 | −1 | −1 | 1 |
| −1 | −1 | −1 | 1 |

FIG. 5

| 1 | $X_0$ | $X_1$ | $X_1X_0$ | $X_2$ | $X_2X_0$ | $X_2X_1$ | $X_2X_1X_0$ |
|---|---|---|---|---|---|---|---|
| 1 | 1 | 1 | 1 | 1 | 1 | 1 | 1 |
| 1 | -1 | 1 | -1 | 1 | -1 | 1 | -1 |
| 1 | 1 | -1 | -1 | 1 | 1 | -1 | -1 |
| 1 | -1 | -1 | 1 | 1 | -1 | -1 | 1 |
| 1 | 1 | 1 | 1 | -1 | -1 | -1 | -1 |
| 1 | -1 | 1 | -1 | -1 | 1 | -1 | 1 |
| 1 | 1 | -1 | -1 | -1 | -1 | 1 | 1 |
| 1 | -1 | -1 | 1 | -1 | 1 | 1 | -1 |

FIG. 6

| $d_0$ | 1 | 1 | 1 | 1 |  | 1 | 1 | 1 | 1 |
| --- | --- | --- | --- | --- | --- | --- | --- | --- | --- |
| $d_1$ | 1 | -1 | 1 | -1 |  | 1 | -1 | 1 | -1 |
| $d_2$ | 1 | 1 | -1 | -1 |  | 1 | 1 | -1 | -1 |
| $d_3$ | 1 | -1 | -1 | 1 |  | 1 | -1 | -1 | 1 |
|  |  |  |  |  |  |  |  |  |  |
|  | 1 | 1 | 1 | 1 |  | -1 | -1 | -1 | -1 |
|  | 1 | -1 | 1 | -1 |  | -1 | 1 | -1 | 1 |
|  | 1 | 1 | -1 | -1 |  | -1 | -1 | 1 | 1 |
|  | 1 | -1 | -1 | 1 |  | -1 | 1 | 1 | -1 |

BINARY DATA CLASSIFICATION METHOD, BINARY DATA CLASSIFICATION DEVICE, COMPUTER PROGRAM, AND STORAGE MEDIUM

This application is the national phase under 35 U.S.C. §371 of PCT International Application No. PCT/JP2007/051807 which has an International filing date of Feb. 2, 2007 and designated the United States of America.

TECHNICAL FIELD

The present invention relates to a data classification method, a data classification device, a computer program, and a storage medium, which can classify binary data into two classes by using a polynomial function having a small number of terms.

BACKGROUND ART

A data classification method for classifying data in a database having a large quantity of information into a plurality of classes is becoming an essential art for information processing in recent years.

As for classification of certain data, the data can rarely be classified clearly, so that a method is proposed in which learning is carried out by using data for learning, which has been accurately classified in advance, and classification is carried out on the basis of the learning result. For example, supervised learning to automatically learn how to classify the data from data for learning, of which correct answer has been known in advance, a learning method using a kernel function such as a support vector machine has been known (for example, refer to Patent Document 1).

[Patent Document 1] Japanese Patent Application Laid-Open No. 2000-293502

DISCLOSURE OF THE INVENTION

Problems to be Solved by the Invention

As a kernel function, one using an inner product is a main stream, however, it has been known that it takes a much longer time for classification as compared to other conventional methods in the case of using an inner product. This is because so many calculations of inner product in the range of several thousands to several hundred thousands are necessary for classification of one data.

On the other hand, in a two-class classification problem to classify the given data into two classes, a polynomial function is used in many cases. By setting a threshold in advance and assigning the polynomial function with the given data, a value of this polynomial function is obtained, and by checking a magnitude relation with the threshold, it is capable of classifying the data into two classes.

However, in a field of a neural network or the like, there is such a problem that the number of monomials constituting polynomial functions to be set is significantly increased and a high-capacity memory and a high-speed computing device are needed.

The present invention has been made taking the foregoing problems into consideration and an object thereof is to provide a data classification method, a data classification device, a computer program, and a storage medium, which can provide an upper limit to the number of monomials necessary for solving a two-class classification problem by setting a polynomial function having the number of terms fewer than $3 \times 2^{n-2}$ in order to classify the binary data into two classes.

Means for Solving the Problems

A first aspect of the present invention provides a data classification method comprising: setting a function to define binary data made of n pieces (n is an integer number not less than 2) of elements as an input value; computing the value of the function by substituting the set function with respective elements of the given binary data; and carrying out classification of the binary data on the basis of the value of the computed function; wherein, when a value of each element is 1 or −1; the binary data inputted within an information processing apparatus is defined to be an object of classification; a polynomial function is set by a CPU as a computing device within the information processing apparatus so as to classify the binary data into two classes; and a column vector a which satisfies $\mathrm{diag}(y)D^n a > 0$ is computed by using the CPU, where a represents a column vector having a coefficient of each term of the set polynomial function as an element, $D^n$ represents a matrix determined on the basis of a combination of the values taken by the respective terms, and y represents a row vector having as an element the value of a class to which the binary data should be classified when binary data is given, so that a polynomial function having terms, in a number fewer than $3 \times 2^{n-2}$ is obtained.

A second aspect of present invention provides a data classification device for setting a function to define binary data made of n pieces (n is an integer number not less than 2) of elements as an input value; computing the value of the function by substituting the set function with respective elements of the given binary data; and carrying out classification of the binary data on the basis of the value of the computed function; comprising means for accepting binary data in which a value of each element is 1 or −1; means for setting a polynomial function by a CPU as a computing device so as to classify the binary data into two classes; and means for computing a column vector a which satisfies $\mathrm{diag}(y)D^n a > 0$ by using the CPU, where a represents a column vector having a coefficient of each term of the set polynomial function as an element, $D^n$ represents a matrix determined on the basis of a combination of the values taken by the respective terms, and y represents a row vector having as an element the value of a class to which binary data should be classified when the binary data is given, wherein, by these means, a polynomial function having terms in a number fewer than $3 \times 2^{n-2}$ is obtained.

A third aspect of the present invention provides a computer program, which allows a computer to set a function to define binary data made of n pieces (n is an integer number not less than 2) of elements as an input value; and to compute the value of the function by substituting the set function with respective elements of the given binary data; and to carry out classification of the binary data on the basis of the value of the computed function; comprising the steps of: allowing the computer to compute a column vector a which satisfies $\mathrm{diag}(y)D^n a > 0$ by using a CPU as a computing device within the computer, where a represents a column vector having a coefficient of each term of the set polynomial function as an element, $D^n$ represents a matrix determined on the basis of a combination of the values taken by the respective terms, and y represents a row vector having the value of a class to which binary data whose elements have a value of 1 or −1 should be classified when the binary data is inputted in the computer; and allowing the computer to set a polynomial function having terms in a number fewer than $3 \times 2^{n-2}$, by using the CPU so as to classify the binary data into two classes by using the column vector a, which is computed by the above step.

A fourth aspect of the present invention provides a computer readable storage medium storing a computer program which allows a computer to set a function to define binary data made of n pieces (n is an integer number not less than 2) of elements as an input value; and to compute the value of the function by substituting the set function with the respective elements of the given binary data; and to carry out classification of the binary data on the basis of the value of the computed function; wherein the storage medium stores a computer program, comprising the steps of; allowing a computer to compute a column vector a to satisfy $\text{diag}(y)D^n a>0$ by using a CPU as a computing device within the information processing apparatus, where a represents a column vector having a coefficient of each term of the set polynomial function as an element, $D^n$ represents a matrix determined on the basis of a combination of the values taken by the respective terms, and y represents a row vector having the value of a class to which the binary data whose elements have a value of 1 or −1 should be classified when the binary data is inputted in the computer, and allowing the computer to set a polynomial function of having terms in a number fewer than $3 \times 2^{n-2}$, by using the CPU, so as to classify the binary data into two classes by using the column vector a, which is computed by the above step.

According to the present invention, the number of monomials necessary to solve the two-class classification problem is decreased because a function for use in classifying the binary data into two classes is set to be a polynomial function having terms in a number fewer than $3 \times 2^{n-2}$.

In addition, according to the present invention, respective coefficients of a polynomial function to be set are represented by a column vector $a=[a_0, a_1, \ldots, a_m]^T$ ($m=2^{n-1}$), and under the condition of $\text{diag}(y)D^n a>0$, the column vector a is obtained, so that at least ¼ of elements of the column vector a becomes zero.

Effects of the Invention

In the case of the present invention, as a criterion for classifying the binary data into two classes, a polynomial function is used, and further, the number of terms is set to be fewer than $3 \times 2^{n-2}$. Generally, by using a polynomial function made of $2^n$ pieces of monomials, any type of two-class classification problem can be solved. However, in the present invention, a polynomial function can be set by using monomials fewer than $3 \times 2^{n-2}$. Therefore, even in the case of solving a large problem, it is possible to reduce a memory to be used and improve a computing speed.

In addition, according to the present invention, respective coefficients of a polynomial function to be set are represented by a column vector $a=[a_0, a_1, \ldots, a_m]^T$, and the column vector a is obtained under the condition of $\text{diag}(y)D^n a>0$, so that at least ¼ of elements of the column vector a becomes zero. Accordingly, the number of terms of the polynomial function can be decreased to be fewer than $2^{n-2}$, and even in the case of solving a large problem, it is possible to reduce a memory to be used and improve a computing speed.

EXPLANATION OF THE REFERENCE NUMERALS

100: information processing apparatus
101: CPU
102: ROM
103: RAM
104: storing device
105: input and output IF
106: keyboard
107: monitor
108: auxiliary storage device
110: storage medium

BEST MODE FOR CARRYING OUT THE INVENTION

Hereinafter, the present invention will be specifically described with reference to the drawings showing the embodiment thereof.

First Embodiment

Figure 1:
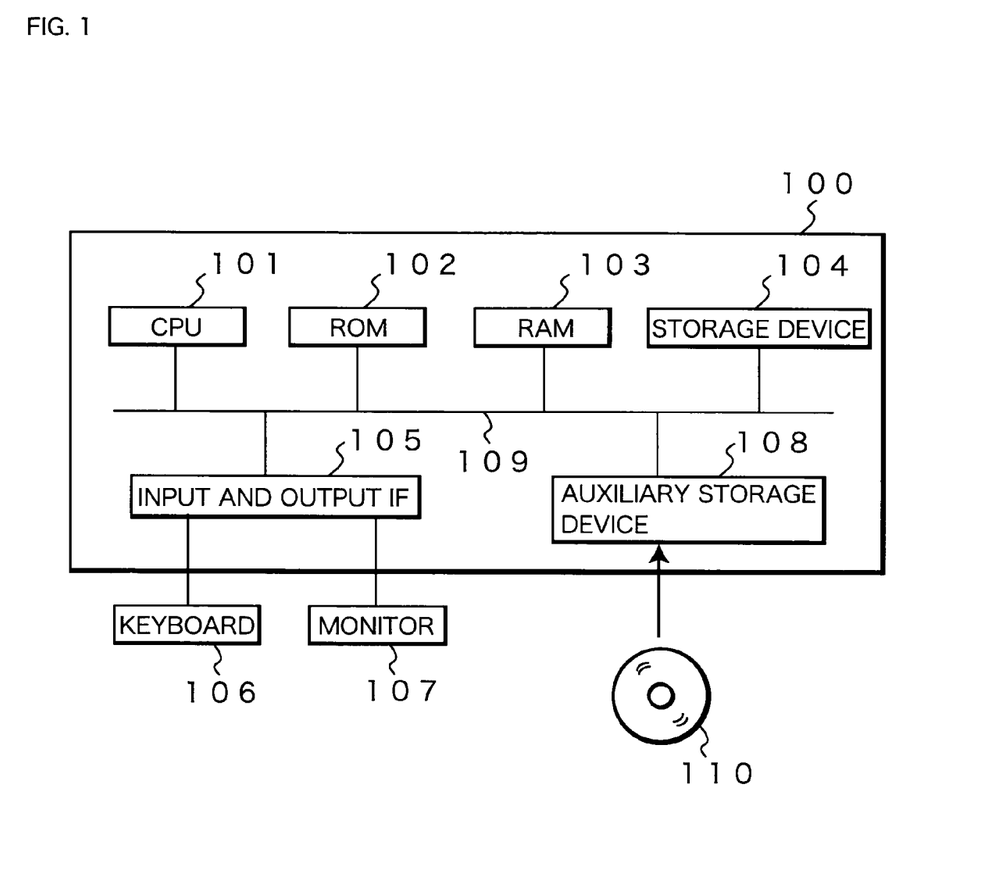
FIG. 1 is a block diagram showing an internal constitution of a data classification device according to the present invention.

FIG. 1 is a block diagram showing an internal constitution of a data classification device according to the present invention. The data classification device according to the present invention is realized by an information processing apparatus 100 such as a personal computer and a work station. The information processing apparatus 100 is provided with a CPU 101 as a computing device, and hardware such as a ROM 102, a RAM 103, a storage device 104, an input and output IF 105, and an auxiliary storage device 108 are connected to this CPU 101 via a bus 109.

In the ROM 102, a control program for controlling the operation of various hardware connected to the bus 109 is stored. The CPU 101 loads and executes this control program on the RAM 103 to control the operation of the entire hardware.

The storage device 104 is provided with a hard disc drive to store a computer program for realizing the data classification method of the present invention and the data needed for executing this computer program or the like.

To the input and output IF 105, a keyboard 106 as the input device and a monitor 107 as an output device are connected. The information processing apparatus 100 accepts the data as a classification object and an activation start instruction of the above-described computer program or the like through the keyboard 106. In addition, the information processing apparatus 100 displays a parameter inputted through the keyboard 106, and a classification result, which is a computation result of the above-described computer program, or the like on the monitor 107.

Further, the above-described computer program is not necessarily preinstalled in the storage device 104 and may be provided by a storage medium 110 such as an FD, a CD-ROM, and a DVD. Therefore, the information processing apparatus 100 is provided with the auxiliary storage device 108 such as an FD drive, a CD-ROM drive, and a DVD drive for reading a computer program from the storage medium 110, in which the computer program is stored. The computer program read by the auxiliary storage device 108 is stored in the storage device 104. The CPU 101 allows the information processing apparatus 100 to operate as a data classification device according to the present invention by loading and executing the above-described computer program from the storage device 104 on the RAM 103 as needed.

According to the present embodiment, through the computing processing by means of the information processing apparatus 100, a two-class classification problem to be described below will be solved. The two-class classification problem is given by $C=(S^+, S^-)$. Here, $S^+$ and $S^-$ satisfy $S^+ \subset \{-1, 1\}^n$ and $S^- \subset \{-1, 1\}^n$, and they represent different classes from each other. An expression of $f(x): \{-1, 1\}^n \to R$ (R is a real number) becomes a solution for C, in which $f(x)>0$ is established to any x that satisfies $x \in S^+$, and $f(x)<0$ is established, that satisfies x to satisfy $x \in S^-$.

According to the present embodiment, as a solution of a two-class classification problem, a polynomial function $p(x_0, x_1, \ldots, x_{n-1})$ is obtained. The polynomial function $p(x_0, x_1, \ldots, x_{n-1})$ will be given by the following expression.

$$p(x_0, x_1, \ldots, x_{n-1}) = \sum_{i=0}^{2^n-1} a_i \prod_{k \in S_i} x_k \qquad \text{[Expression 1]}$$

Here, $S_i \subset \{0, 1, \ldots, n-1\}$ is established, and $x_i^2=1$ is established to all i. Each term of a polynomial function $p(x_0, x_1, \ldots, x_{n-1})$ excluding a coefficient $a_i$ is referred to as a monomial.

Next, indexing of a monomial with a combination of terms is defined. A function $K(m)$ will be defined by the following expression.

$$K(m) = K\left(\prod_{k \in S_i} x_k\right) = 1 + \sum_{k \in S_i} 2^k \qquad \text{[Expression 2]}$$

In this case, the function $K(m)$ expresses one-to-one mapping between a set of monomials and $\{1, 2, \ldots, 2^n\}$. Therefore, indexing to a monomial is expressed by the following expression:

$$m_j = \prod_{k \in S_i} x_k \Leftrightarrow j = K\left(\prod_{k \in S_i} x_k\right) \qquad \text{[Expression 3]}$$

In addition, a coefficient $m_j$ is identified as a coefficient $a_j$. Through to this indexing, the polynomial function p is expressed by the following expression with a vector notation.

$$p(x_0, \ldots, x_{n-1}) \equiv (a_0, \ldots, a_{2^n-1}) \qquad \text{[Expression 4]}$$

In this case, the computing of the polynomial function p is internally given by the following expression.

$$(a_0, \ldots, a_{2^n-1})(m_0, \ldots, m_{2^n-1})^T|_{(x_0, \ldots, x_{n-1})} \qquad \text{[Expression 5]}$$

Next, the polynomial function p is formulated by using a matrix.

$$p(x_0, x_1, \ldots, x_{n-1}) = a_0 + a_1 x_0 + a_2 x_1 + a_3 x_1 x_0 + \ldots + a_{2^n-1} x_{n-1} x_n \ldots x_0$$

$$d_i = (m_0, \ldots, m_{2^n-1})|_{i = \chi(x_0, \ldots, x_{n-1})}$$

$$a = [a_0, a_1, \ldots, a_{2^n-1}]^T \qquad \text{[Expression 6]}$$

In this case, $D^n_a$ expresses an influence of the polynomial function p on $\{-1, 1\}^n$. Here, $D^n$ is a matrix of $2^n \times 2^n$ and this is given by the following expression:

$$D^n = \begin{bmatrix} d_0 \\ \vdots \\ d_{2^n-1} \end{bmatrix} \qquad \text{[Expression 7]}$$

Here, $D^n$ is referred to as a substitution matrix of an order n, and $D^n_a$ is a matrix expression of the polynomial function p. For example, the substitution matrix of the second order can be expressed as follows:

$$p(x_0, x_1) = a_0 + a_1 x_0 + a_2 x_1 + a_3 x_1 x_0 \text{ on } \{-1, 1\}^2 \qquad \text{[Expression 8]}$$

$$p(\{-1, 1\}^2) \equiv \begin{bmatrix} +1 & +1 & +1 & +1 \\ +1 & -1 & +1 & -1 \\ +1 & +1 & -1 & -1 \\ +1 & -1 & -1 & +1 \end{bmatrix} \begin{bmatrix} a_0 \\ a_1 \\ a_2 \\ a_3 \end{bmatrix} = \begin{bmatrix} p(+1, +1) \\ p(-1, +1) \\ p(+1, -1) \\ p(-1, -1) \end{bmatrix}$$

In a two-class classification problem $C=(S^+, S^-)$, the column of the matrix $D^n$ is divided into $D_+^n$ and $D_-^n$ so as to satisfy a condition of $D_+^n{}_a>0$, $D_-^n{}_a>0$. Here, $a=[a_0, a_1, \ldots, a_n]^T \in R^n$ is a coefficient of the polynomial function p.

$$Y = \begin{bmatrix} y_1 & & \\ & \ddots & \\ & & y_{2^n} \end{bmatrix} \text{ where, } y_i = \begin{cases} -1 & \text{if } i \in \chi(S^-) \\ +1 & \text{if } i \in \chi(S^+) \end{cases} \qquad \text{[Expression 9]}$$

When the expression 9 is defined, the two-class classification problem C is equal to obtaining a vector $a=[a_0, a_1, \ldots, a_n]^T \in R^n$ so that $YD^n a>0$ is established.

Figure 2:
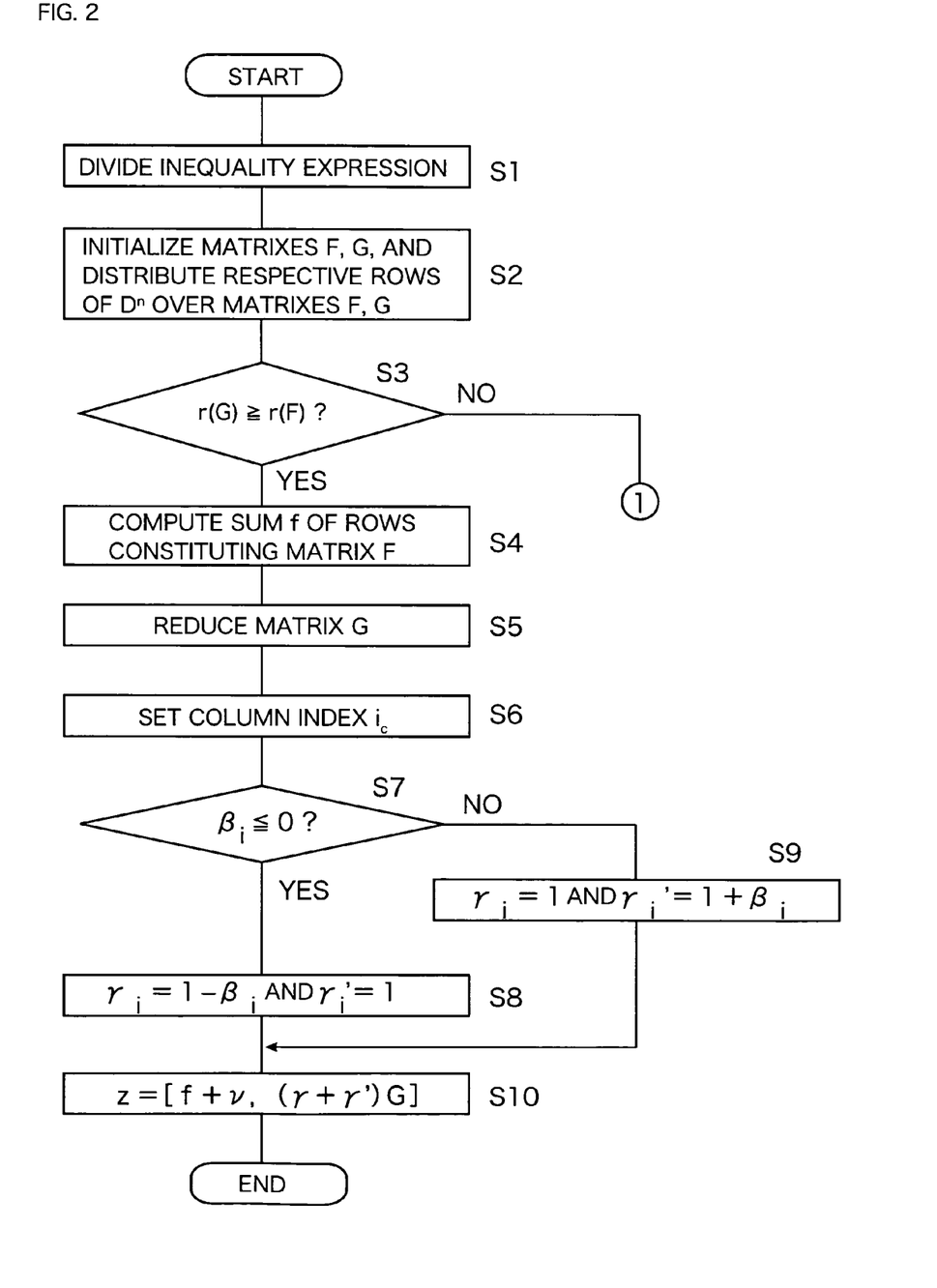
FIG. 2 is a flow chart for explaining a procedure of a processing to be carried out by an information processing apparatus for obtaining a polynomial function.
Figure 3:
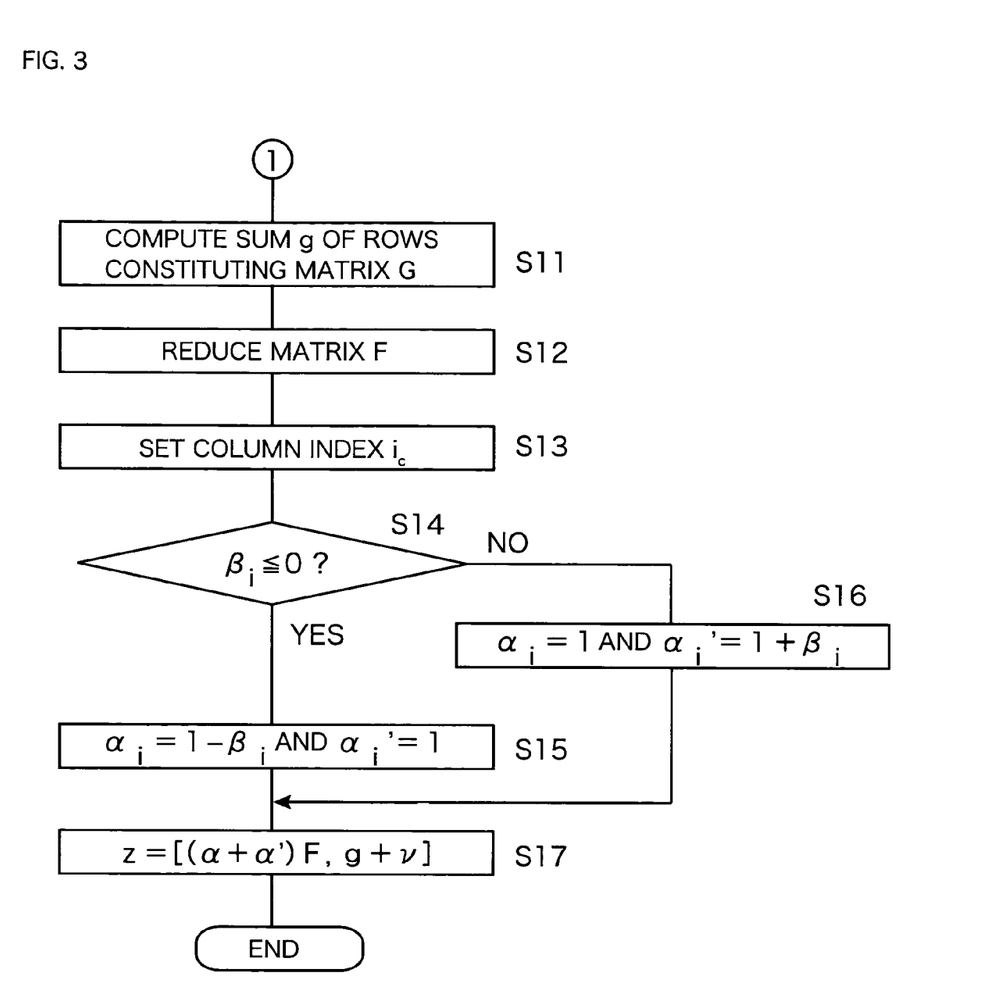
FIG. 3 is a flow chart for explaining a procedure of a processing to be carried out by an information processing apparatus for obtaining a polynomial function.

Next, a specific algorithm will be described. Each of FIG. 2 and FIG. 3 is a flow chart for explaining a procedure of a processing to be carried out by the information processing apparatus 100 for obtaining a polynomial function. As described above, any two-class classification problem can be expressed by $\text{diag}(y)D^n z>0$. Here, $y \in \{-1, 1\}^n$ is established, and a vector z is a column vector to give a coefficient of a monomial constituting a polynomial function to be obtained.

First, the CPU 101 of the information processing apparatus 100 divides the above-described inequality expression into two parts (step S1). In other words, diag(y)D"z>0 is expressed as follows:

$$\text{diag}\left(\begin{bmatrix} y^u \\ y^d \end{bmatrix}\right) \begin{bmatrix} d_0 & d_0 \\ \vdots & \vdots \\ d_{2^n-1} & d_{2^n-1} \\ d_0 & d_0 \\ \vdots & \vdots \\ d_{2^n-1} & d_{2^n-1} \end{bmatrix} \begin{bmatrix} x \\ t \end{bmatrix} > 0 \qquad \text{[Expression 10]}$$

Next, the CPU 101 initializes matrixes F and G, and respective rows of $d_0, d_1, \ldots, d_m$ ($m=2^n-1$) are distributed as follows (step S2). In other words, in the case of $(y_{iu}, y_{id})=(+1, +1)$, $d_i$ is added to the matrix F, and in the case of $(y_{iu}, y_{id})=(-1, -1)$, $-d_i$ is added to the matrix F. In addition, in the case of $(y_{iu}, y_{id})=(+1, -1)$, $d_i$ is added to the matrix G, and in the case of $(y_{iu}, y_{id})=(-1, +1)$, $-d_i$ is added to the matrix G.

Next, the CPU 101 compares the number of rows constituting the matrix F and the matrix G to determine if the number of rows r(G) constituting the matrix G is not less than r(G), which is the number of rows constituting the matrix F, or not (step S3).

In the case that the number of rows constituting each of the matrix F and the matrix G satisfies r(G)≧r(F) (S3: YES), the following processing will be carried out. First, the CPU 101 obtains a sum f of the rows constituting the matrix F (step S4). In addition, the row reduced Echelon form of G (G') to be obtained by reducing the matrix G is obtained (step S5). Consequently, a first nonzero element that appears in the ith row of the matrix G' is determined to be a column index $i_c$ (step S6). Further, ν and β are given by the following expression:

$$v = \sum_{i=1\ldots r(G)} -f_{i_c} G'_i \qquad \text{[Expression 11]}$$

$$\beta = 2^{-(n-1)} v G^T$$

Then, the CPU 101 checks each element $\beta_i$ of β, and determines if each element $\beta_i$ is not more than 0 or not (step S7). If the CPU 101 determines that the value of $\beta_i$ is not more than 0 (S7: YES), the CPU 101 calculates $\gamma_i=1-\beta_i$ and may set $y_i'$ at 1 (step S8). In addition, when the CPU 101 determines that the value of $\beta_i$ is larger than 0 (S7: NO), the CPU 101 sets $\gamma_i$ at 1 and calculates $\gamma_i'=1+\beta_i$ (step S9).

In this case, the CPU 101 gives a vector z expressing respective coefficients of the polynomial function by the following expression: (step S10)

$$z=[f+vv,(\gamma+\gamma')]G \qquad \text{[Expression 12]}$$

Here, the CPU 101 ends the computation by the present routine.

On the other hand, in the case that the number of rows constituting each of the matrix F and the matrix G satisfies r(G)<r(F) (S3: NO), the following processing will be carried out. First, the CPU 101 obtains a sum g of the rows to constitute the matrix G (step S11). In addition, the row reduced Echelon form of F (F') to be obtained by reducing the matrix F is obtained (step S12). Consequently, a first nonzero element that appears in the ith row of the matrix F' is determined to be a column index $i_c$ (step S13). Further, ν and β are given by the following expression:

$$v = \sum_{i=1\ldots r(F)} -g_{i_c} F'_i \qquad \text{[Expression 13]}$$

$$\beta = 2^{-(n-1)} F^T$$

Then, the CPU 101 checks each element $\beta_i$ of β, and determines if each element $\beta_i$ is not more than 0 or not (step S14). If the CPU 101 determines that the value of $\beta_i$ is not more than 0 (S14: YES), the CPU 101 calculates $\alpha_i=1-\beta_i$ and sets $\alpha_i'$ at 1 (step S15). In addition, when the CPU 101 determines that the value of $\beta_i$ is larger than 0 (S14: NO), the CPU 101 sets $\alpha_i$ at 1 and calculates $\alpha_i'=1+\beta_i$ (step S16).

In this case, the CPU 101 gives a vector z expressing respective coefficients of the polynomial function by the following expression: (step S17)

$$z=[(\alpha+\alpha')F,g+v] \qquad \text{[Expression 14]}$$

Here, the CPU 101 ends the computation by the present routine.

A computation result of this algorithm, namely, z satisfies the above-described inequality expression diag(y)D"z>0 and gives a solution to the two-class classification problem. An important and new property of this algorithm is that $2^n/4$ among the elements to constituting the vector z, which is obtained as a solution, is zero. In other words, the number of terms of the obtained polynomial function (the monomial) becomes the number fewer than $3\times 2^{n-2}$ to any two-class classification problem to be classified into {−1, 1}. As a result, in the case that data as a classification object is given, a computation resource such as a memory capacity can be controlled to be lower, and a high speed classification become possible.

Figure 4:
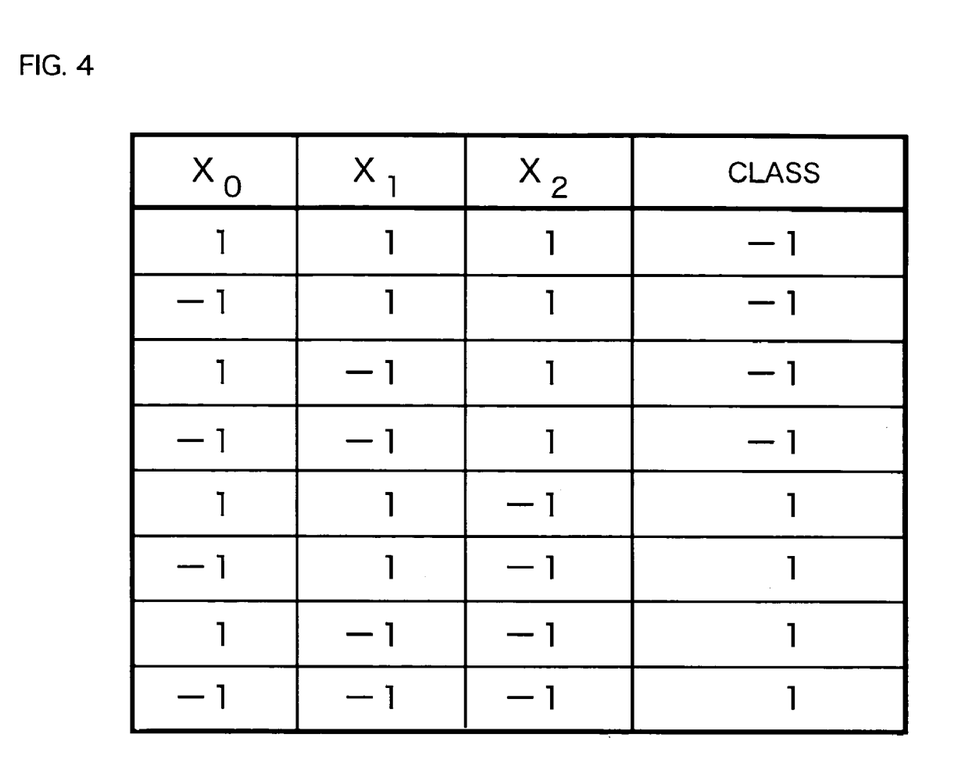
FIG. 4 is a diagram for showing an example of a class classification problem.

Next, an application example will be described. FIG. 4 is a diagram for showing an example of a class classification problem. In FIG. 4, a value of a class is defined, to which data should belong when elements $X_0, X_1, X_2$ is given. Since there are three elements, according to the present invention, a polynomial function constituted by a monomial having terms fewer than six ($=3\times 2^{n-2}=3\times 2^1$) is obtained.

Figure 5:
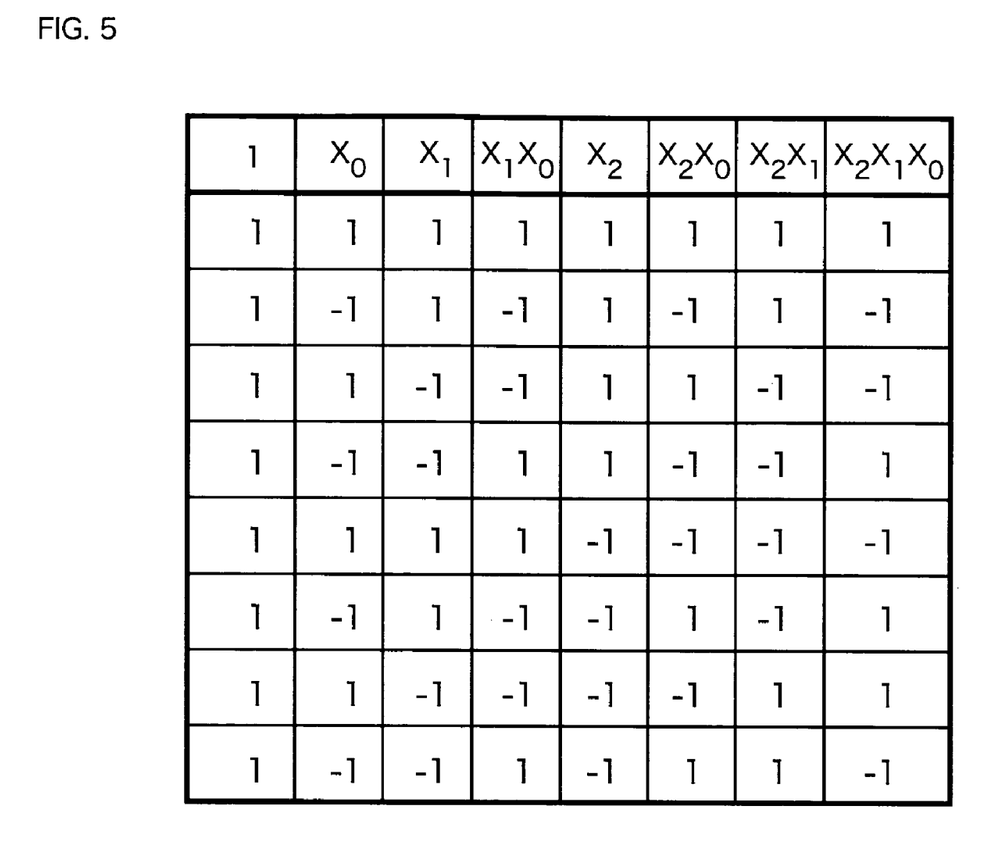
FIG. 5 is a diagram showing elements of a matrix $D^3$.

In the case of applying the above-described algorithm, the two-class classification problem is equal to obtaining of z to satisfy diag(y)D³z>0. Here, y=[−1, −1, 1, 1, 1, −1, −1, −1] is established, and D³ is defined as a matrix having the elements shown in the diagram of FIG. 5.

Figure 6:
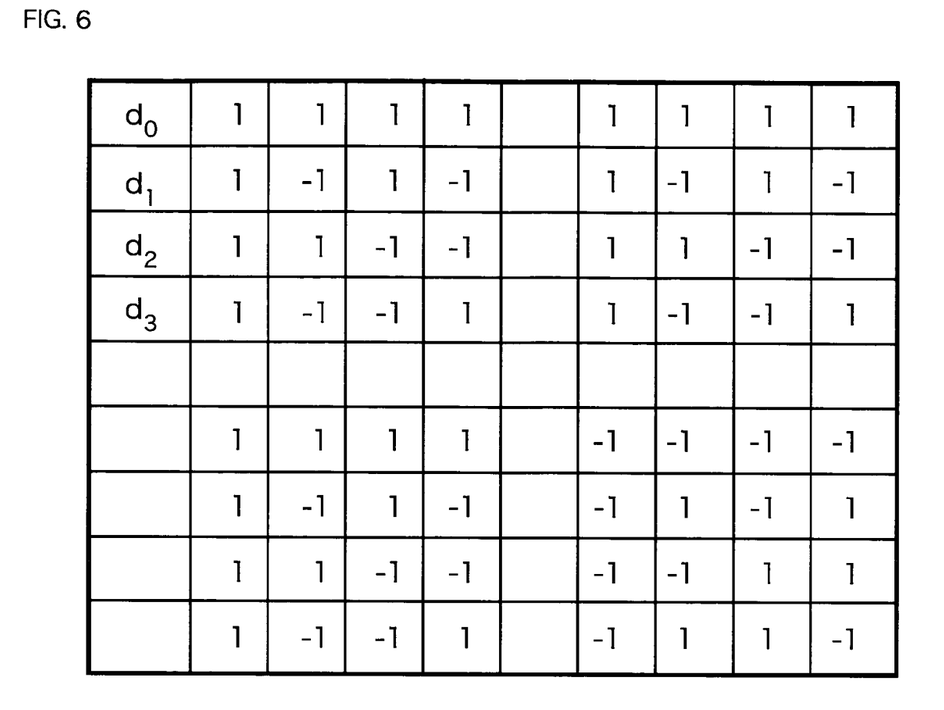
FIG. 6 is a diagram showing a divided matrix $D^3$.

Through the processing of step S1, a vector y is divided into $y_u=[-1, -1, 1, 1]$ and $y_d=[1, -1, -1, -1]$, and a matrix D" is divided like the diagram shown in FIG. 6.

Through the processing of step S2, the matrixes F and G are initialized to distribute respective rows of the matrix D". In other words, since $(y_{0u}, y_{0d})=(-1, +1)$ is established, $-d_0$ is added to the matrix G. In the same way, since $(y_{1u}, y_{1d})=(-1, -1)$ is established, $-d_1$ is added to the matrix F, since $(y_{2u}, y_{2d})=(+1, -1)$ is established, $d_2$ is added to the matrix G, and since $(y_{3u}, y_{3d})=(+1, -1)$ is established, $d_3$ is added to the matrix F. As a result, the number of rows of the matrix F, r(F) is 1, and the number of rows of the matrix G, r(G) is 3.

In order to satisfy the condition of r(G)≧r(F), the CPU carries out the processing of step S4 to obtain a sum f of the rows constituting the matrix F. As a result, f=(−1, 1, −1, 1) is obtained. In addition, through the processing of step S12, reducing the matrix G, the row reduced Echelon form of G (G') is obtained. The matrix G' is represented by the following expression.

$$G' = \begin{pmatrix} 1 & 0 & 0 & 1 \\ 0 & 1 & 0 & -1 \\ 0 & 0 & 1 & 1 \end{pmatrix} \quad \text{[Expression 15]}$$

A column index is determined to be $1_c=1, 2_c=2, 3_c=3$, from this matrix G'. In this case, ν and β are calculated as follows:

$$\nu = -f_1 G_1' - f_2 G_2' - f_3 G_3' = (1,-1,1,3)$$

$$\beta = 2^{-2} I(1,-1,1,3) G^T = (-1,-1,1) \quad \text{[Expression 16]}$$

Next, checking positive and negative of respective elements of β, γ and γ' are obtained. Then, γ and γ' are obtained, respectively, as follows: γ=(2, 2, 1), and γ'=(1, 1, 2). In this case, since z=[f+ν, (γ+γ') G] is established, respective elements of z are obtained, so that z=(0, 0, 0, 4, 3, −3, −9, −3) is established.

In this way, a solution of the two-class classification problem is obtained as follows:

$$p(x_0, x_1, x_2) = -3x_2 x_1 x_0 - 9x_2 x_1 - 3x_2 x_0 + 3x_2 + 4x_1 x_0 \quad \text{[Expression 17]}$$

In the case of substituting the above expression with the values of $x_0$, $x_1$, and $x_2$, it is clear that the definition shown in FIG. 4 is satisfied. In addition, the number of monomials to constitute the polynomial function p ($x_0$, $x_1$, $x_2$) is 5, and it is clear that the number of monomials is fewer than $3 \times 2^{n-2}$.

Second Embodiment

By using the data classification device, which has been explained in the first embodiment, it is possible to build an image recognition apparatus to realize character recognition and pattern recognition or the like. According to the present embodiment, an image recognition apparatus to recognize a digital number made of 8×8 pixels will be described.

Figure 7:
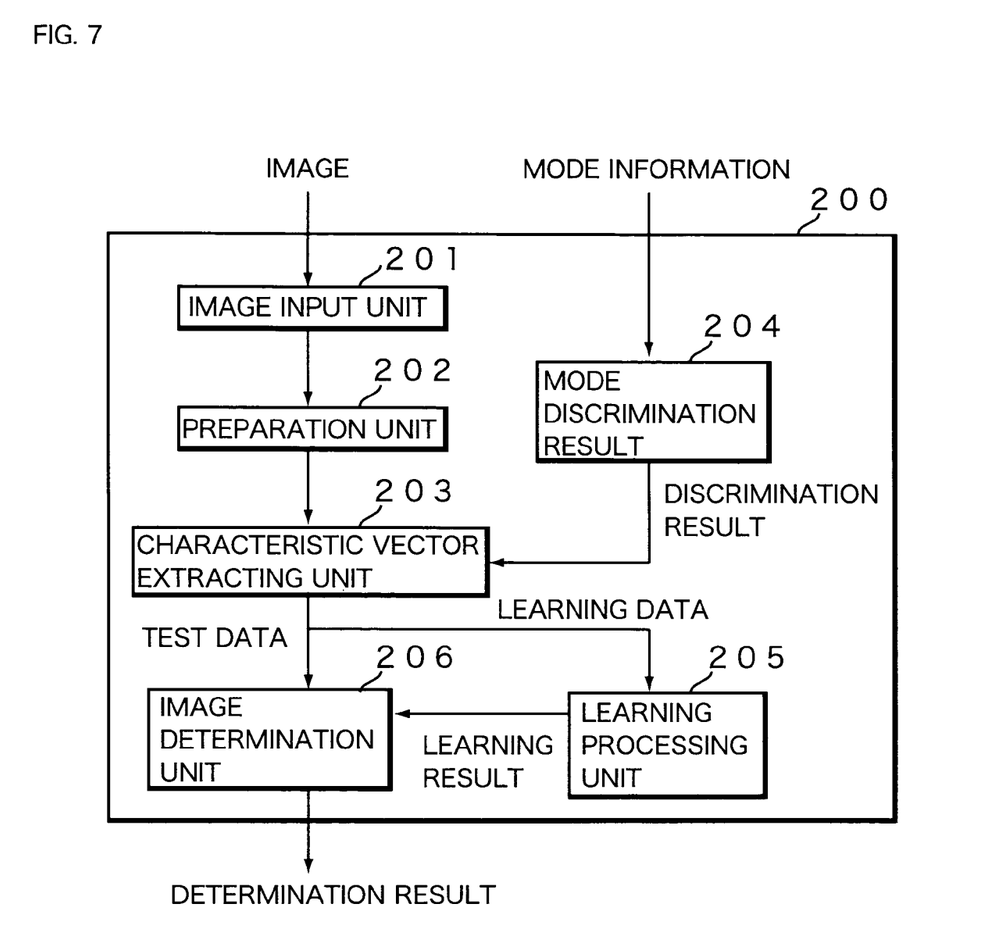
FIG. 7 is a block diagram showing an internal constitution of an image recognition apparatus according to the present invention.

FIG. 7 is a block diagram showing an internal constitution of an image recognition apparatus according to the present embodiment. An image recognition apparatus 200 is provided with an image input unit 201, a preparation unit 202, a characteristic vector extracting unit 203, a mode discrimination unit 204, a learning processing unit 205, and an image determination unit 206.

The image input unit 201 is an input device such as a scanner, which optically reads an image such as a character and a pattern, and the image data obtained by this image input unit 201 is outputted to the preparation unit 201.

The preparation unit 202 is a processing unit to carry out the preparation of the image data, which is received from the image input unit 201. Specifically, after smoothing the image data and removing a noise from the image, by binarizing this image data with a predetermined threshold, a binary image is generated. Further, in the case that the inputted image data is a monochrome image, the binarization processing can be omitted.

The characteristic vector extracting unit 203 extracts a vector expressing a characteristic of an image (hereinafter, referred to as a characteristic vector). As a method of extracting a characteristic vector, any extraction method may be utilized, whereby a vector having predetermined number of elements can be outputted while a value of each element is 1 or −1.

The image recognition apparatus 200 has a learning mode for learning the image, which is an object of recognition, and a determination mode for realizing the image recognition with respect to the inputted image, and the image recognition apparatus 200 accepts the information (mode information) for discriminating a mode from the outside. The mode discrimination unit 204 sends a determination result to the characteristic vector extracting unit 203 according to the mode information, which is accepted from the outside.

When the determination result of the mode discrimination unit 204 indicates the learning mode, the characteristic vector extracting unit 203 outputs the extracted characteristic vector as learning data to the learning processing unit 205, and when the determination result of the mode discrimination unit 204 indicates the determination mode, the characteristic vector extracting unit 203 outputs the extracted characteristic vector as test data to the learning processing unit 205.

The learning processing unit 205 decides a polynomial function, which provides a solution of a two-class classification problem, by using the inputted characteristic vector. In other words, by regarding the inputted characteristic vector as a vector y, which is described in the first embodiment, and carrying out computation using the above-described method, respective coefficients of a polynomial function are obtained. The learning processing unit 205 notifies the image determination unit 206 of the decided polynomial function as a learning result.

On the other hand, the image determination unit 206 carries out the image recognition by substituting the polynomial function, which is decided by the learning processing unit 205, with the characteristic vector, which is extracted from the newly inputted image. In the case that the inputted image is determined to be an image of an object of recognition, the polynomial function outputs "1", and in the case that the inputted image is determined to be different from an image of an object of recognition, the polynomial function may output "−1".

Figure 8:
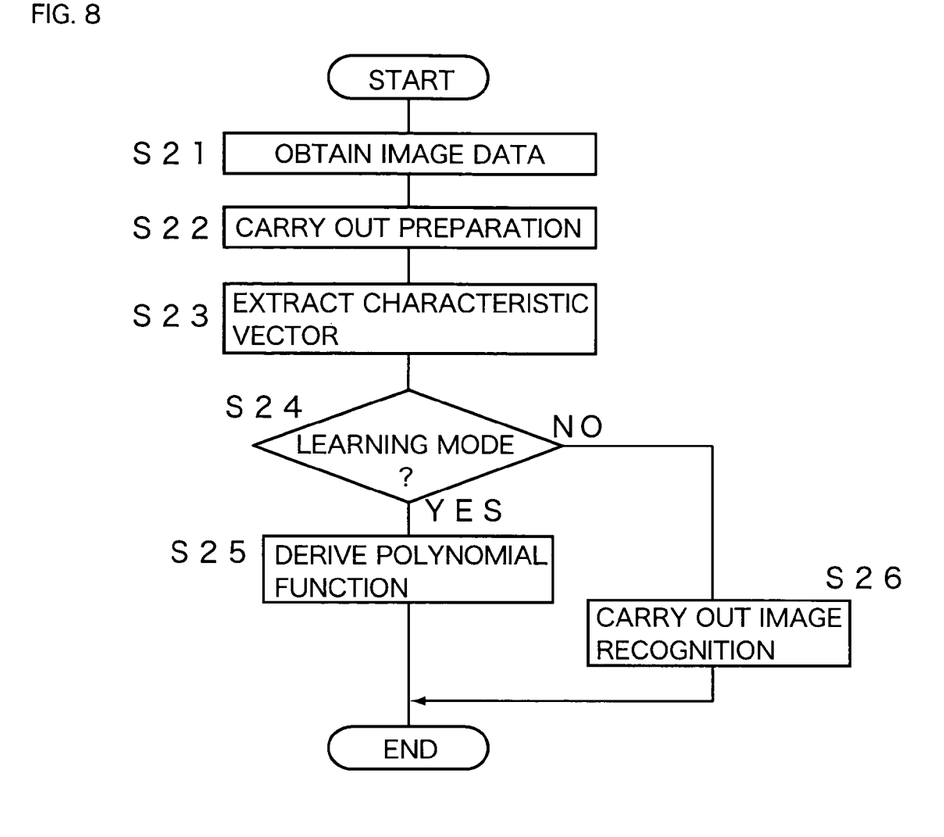
FIG. 8 is a flow chart for explaining a procedure of a processing to be carried out by the image recognition apparatus.
Figure 9:
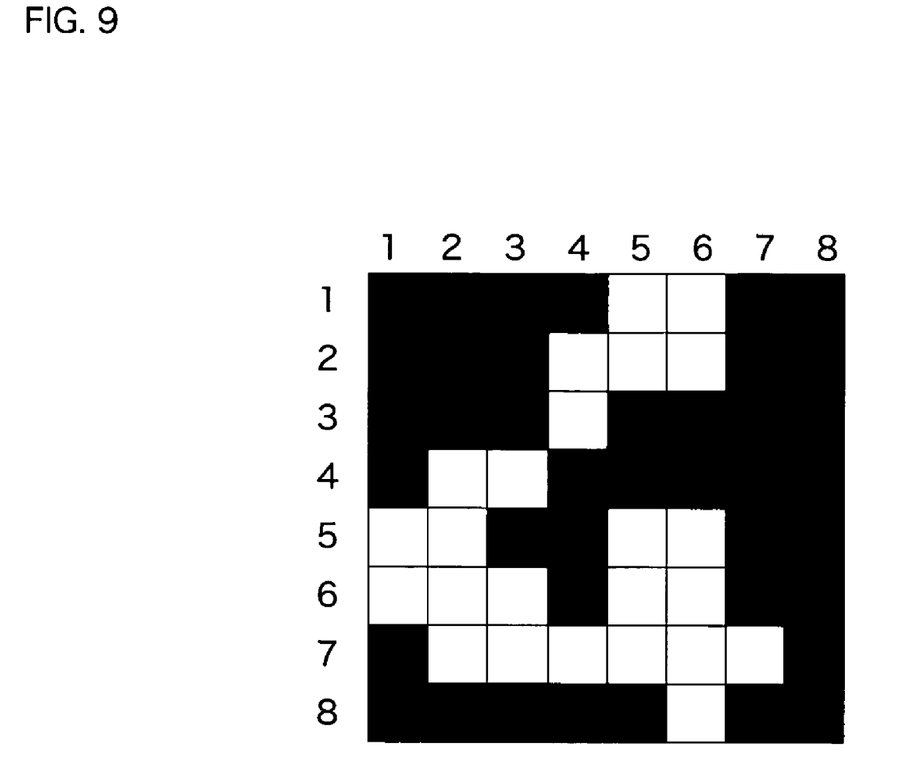
FIG. 9 is a pattern diagram showing an example of image data to be obtained by the image recognition apparatus.

Hereinafter, the procedure of the processing to be carried out by the image recognition apparatus 200 will be described. FIG. 8 is a flow chart for explaining a procedure of a processing to be carried out by the image recognition apparatus 200. At first, the image recognition apparatus 200 may obtain the image data through the image input unit 201 (step S21) to carry out the preparation (step S22). FIG. 9 is a pattern diagram showing an example of image data to be obtained by the image recognition apparatus 200. This example is a two-dimensional image showing a number "4", which is constituted by 8 pixels×8 pixels, and each pixel is binarized.

Next, the characteristic vector extracting unit 203 of the image recognition apparatus 200 extracts the characteristic vector (step S23). As an extraction method of the characteristic vector, an existing method can be used. According to the present embodiment, the extraction method for outputting the characteristic vector of 10 bits having 1 or −1 as an element to the above-described image made of 8 pixels×8 pixels is utilized.

Figure 10:
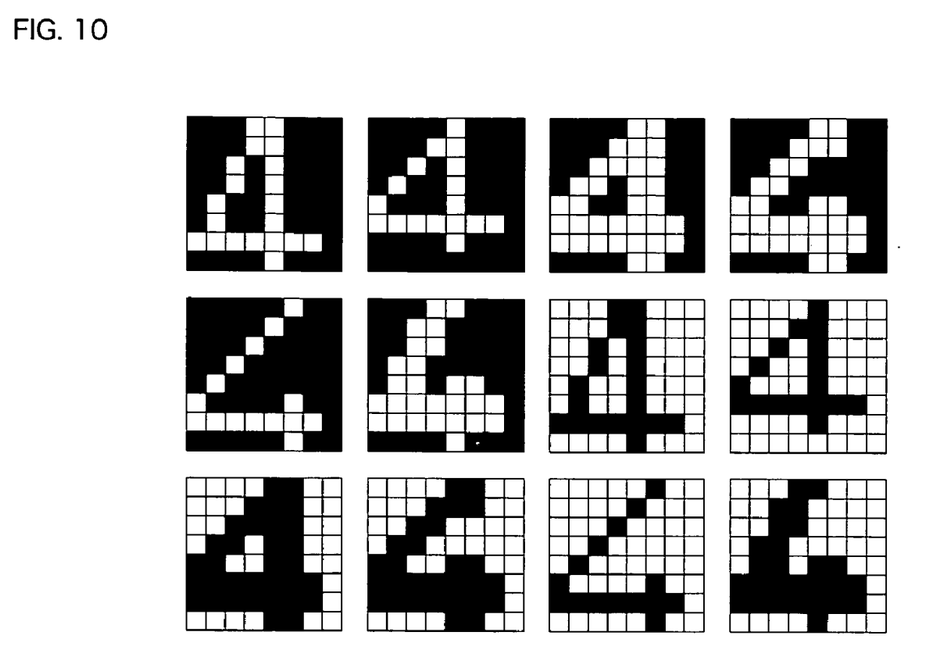
FIG. 10 is a pattern diagram showing an example of an image to be prepared as learning data.

Then, the characteristic vector extracting unit 203 may determine if the mode is a learning mode or not on the basis of the determination result of the mode discrimination unit 204 (step S24). In the case the mode is the learning mode (S24: YES), the polynomial function is derived (step S25). For deriving the polynomial function, by preparing a plurality of images as a recognition object, it is possible to improve an accuracy of recognition. For example, in the case that the image of the number "4" is defined to be a recognition object, images as shown by a pattern diagram of FIG. 10 are prepared as the learning data. By applying the method according to the first embodiment, it is possible to decide the polynomial function which can give a solution of the two-class classification problem.

In the case that the characteristic vector extracting unit 203 determines that the mode is not a learning mode in step 24

Figure 11:
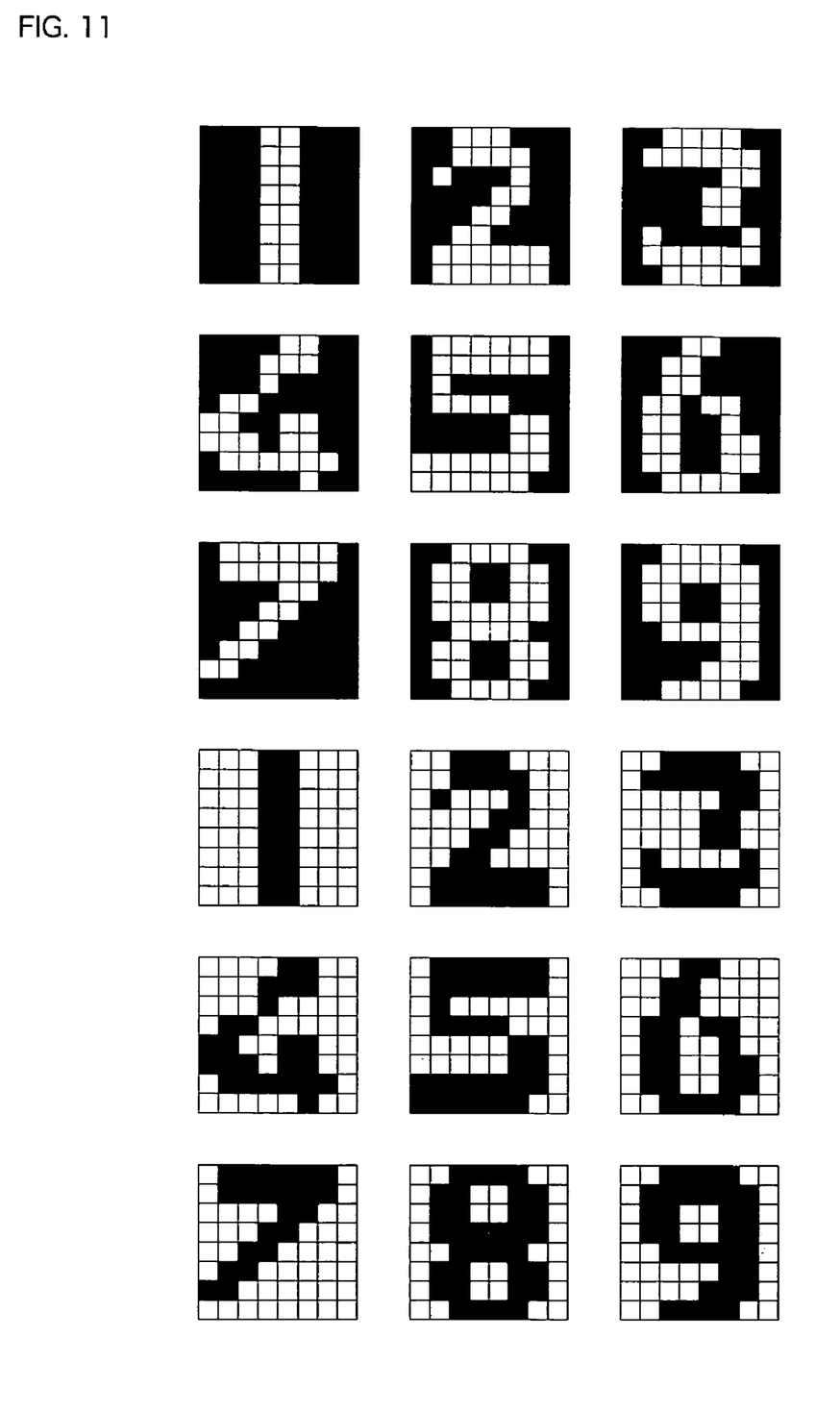
FIG. 11 is a pattern diagram showing test data.

(S24: NO), the image recognition apparatus 200 carries out image recognition by the image determination unit 206 (step S26). However, it is necessary to decide the polynomial function of step S25 prior to the image recognition. The image recognition is carried out by substituting the polynomial function decided by the learning processing unit 205 with the characteristic vector extracted from the newly inputted image. For example, when the test data shown in the pattern diagram of FIG. 11 is inputted, it is possible to recognize the second image and the fifth image from the top of the first column from the left can be recognized as the number "4".

In the case of inputting the learning data shown in FIG. 10 and obtaining the polynomial function, according to a conventional method, 704 pieces of monomials are needed, whereas, when the method according to the present invention is applied, the solution can be described by 356 pieces of monomials. In other words, it has become clear that it is possible to decrease the number of monomials to about 50% or less, about half of the memory capacity can be saved, and classification can be realized at a computing speed approximately two times faster than the normal.

Further, the present embodiment is described as an apparatus for recognizing the image of the number "4", however, it is obvious that the apparatus recognizes other numbers, other characters, and arbitrary patterns.

The invention claimed is:

1. A data classification method comprising: setting a function to define binary data made of n pieces (n is an integer number not less than 2) of elements as an input value; computing the value of the function by substituting the set function with respective elements of the given binary data; and carrying out classification of the binary data on the basis of the value of the computed function;

wherein, a value of each element is 1 or −1; the binary data inputted within an information processing apparatus is defined to be an object of classification; a polynomial function is set by a CPU as computing means within the information processing apparatus so as to classify the binary data into two classes; and a column vector a which satisfies $\text{diag}(y)D''a>0$ is computed by using the CPU, where a represents a column vector having a coefficient of each term of the set polynomial function as an element, $D''$ represents a matrix determined on the basis of a combination of the values taken by the respective terms, and y represents a row vector having as an element the value of a class to which binary data should be classified when the binary data is given so that a polynomial function having terms in a number fewer than $3 \times 2^{n-2}$ is obtained.

2. A data classification device: for setting a function to define a binary data made of n pieces (n is an integer number not less than 2) of elements as an input value; computing the value of the function by substituting the set function with respective elements of the given binary data; and carrying out classification of the binary data on the basis of the value of the computed function; comprising:

means for accepting binary data in which a value of each element is 1 or −1;

means for setting a polynomial function by using a CPU as a computing device so as to classify the binary data into two classes; and means for computing a column vector a which satisfies $\text{diag}(y)D''a>0$ by using the CPU, where a represents a column vector having a coefficient of each term of the set polynomial function as an element, $D''$ represents a matrix determined on the basis of a combination of the values taken by the respective terms is $D''$, and y represents a row vector having as an element the value of a class to which binary data should be classified when the binary data is given, wherein, by these means, a polynomial function having terms in a number fewer than $3 \times 2^{n-2}$ is obtained.

3. A computer readable storage medium storing a non-transitory computer program which allows a computer to set a function to define a binary data made of n pieces (n is an integer number not less than 2) of elements as an input value; and to compute the value of the function by substituting the set function with the respective elements of the given binary data; and to carry out classification of the binary data on the basis of the value of the computed function;

wherein the storage medium stores a computer program, comprising a step of:

allowing a computer to compute a column vector a which satisfies $\text{diag}(y)D''a>0$ by using a CPU as a computing device within the computer, where a represents a column vector having a coefficient of each term of the set polynomial function as an element, $D''$ represents a matrix determined on the basis of a combination of the values taken by the respective terms, and y represents a row vector having as an element the value a class to which binary data whose elements have a value of 1 or −1 should be classified when the binary data is inputted in the computer, and allowing the computer to set a polynomial function having terms in a number fewer than $3 \times 2^{n-2}$, by using the CPU so as to classification the binary data into two classes by using the column vector a, which is computed by the above step.

* * * * *